March 24, 1964 L. A. FUGASSI, JR Re. 25,541

DETECTING WELDS

Original Filed June 9, 1958 2 Sheets-Sheet 1

INVENTOR.
LUCIEN A. FUGASSI, JR.
BY Shanley & O'Neil
ATTORNEY

INVENTOR.
LUCIEN A. FUGASSI, JR.

BY Shanley & O'Neil

ATTORNEYS

United States Patent Office

Re. 25,541
Reissued Mar. 24, 1964

25,541
DETECTING WELDS

Lucien A. Fugassi, Jr., Pittsburgh, Pa., assignor to National Steel Corporation, a corporation of Delaware Original No. 2,995,239, dated Aug. 8, 1961, Ser. No. 740,888, June 9, 1958. Application for reissue Jan. 24, 1963, Ser. No. 256,494
8 Claims. (Cl. 209—72)

Matter enclosed in heavy brackets [ ] appears in the original patent but forms no part of this reissue specification; matter printed in italics indicates the additions made by reissue.

The present invention relates to detecting welds, and more particularly to methods for producing butt-welded metallic sheet and strip material having welded joints which are readily detectable even though covered by an opaque coating material.

In the formation of coated metal sheet such as tinplate, it is the current practice to run the strip to be plated, such as black plate, through the electrotinplating lines, in the form of a continuous strip. In order to provide a continuous strip, it is necessary to join endwise greatly elongated strip in the form of coils. As the strip from one coil is unwound and the end of the coil reached, the free end of the strip from another coil is joined thereto, and so on from coil to coil, with the result that the plating process may be conducted continuously.

In the past, it has been customary to shear the adjacent ends of the coils to be joined and then to lap weld the adjacent ends together, as for example disclosed in U.S. Patent No. 2,478,491, August 9, 1949. The lap welded continuous strip emerging from the plating lines is then sheared into sheet form in another portion of the plant. Certain of these sheets will have a lap weld extending across them. The lap weld is relatively hard and brittle and renders these certain sheets useless for many subsequent forming and shaping operations such as can making. Accordingly, the sheets containing the welds are separated from the remaining sheets and treated as scrap. Despite the fact that the lap welds have been coated with an opaque tinplate, they are nevertheless visible because they alter the normally flat contour of the sheet. Hence, the sheets containing the lap welds can be detected by visual inspection even after tinplating.

In recent years, however, it has increasingly become the practice to ship tinplate from the plant in coils rather than in sheets. The consumer then uncoils and cuts the strip to sheet form as it is required in his production operations. But problems have arisen from the shipment over long distances of lap welded strip in coil form. When the strip in coil form is transported in a truck or on a railroad car, the shimmying of the conveyance causes the convolutions of the coil to rub and press against each other. If the coil includes lap welds of a thickness twice the thickness of the remainder of the sheet, it has been found in practice that upon movement of the coils over long distances the welds impress themselves not only upon the immediately adjacent convolutions but also through a plurality of convolutions of the strip adjacent the weld. At the consumer's plant, the coil is unwound and cut to sheet form and the lap welds visually detected and the corresponding sheets scrapped; but there remains a substantially greater number of sheets which contain no weld yet are heavily marked or scored from the lap welds.

Obviously, one solution of this problem is to butt weld the adjacent ends of the coils prior to running the continuous strip through the electrotinplating lines. The resulting coils of tinplate containing only butt welds can then be shipped over long distances without any appreciable scoring of the adjacent convolutions, as the butt welds have no appreciable difference of contour from the remainder of the strip.

Unfortunately, although the coiled tinplate may reach the consumer in perfect condition, he is presented with a problem when he cuts it to sheet form. The butt welds are essentially smooth and flush. These welds would be visible if they were exposed, but they have been coated with tinplate and can no longer be visually detected with ease. Hence, the consumer is confronted in effect with a stack of tinplates, all of which look alike but certain of which contain hidden welds which would damage his equipment were he to use them all without first separating those containing welds.

Although many attempts have been made to overcome the foregoing difficulties and disadvantages of this prior art, none, as far as is known, has been entirely successful when practiced commercially on an industrial scale.

Accordingly, it is an object of the present invention to provide methods for joining endwise a pair of elongated metal strips by welding in such a way as to produce a readily detectable weld.

Another object of the present invention is the formation between elongated metal strips, of readily detectable coated welds.

Still another object of the present invention is the provision of methods for producing coated metal sheets from butt welded strips, certain of the sheets having readily detectable welds therein.

Yet another object of the present invention is the provision of methods for producing from butt welded metal strip a plurality of coated sheets all of which are free from joints.

A further object of the present invention is the provision of methods for forming and detecting butt welds in the production of coated metal sheets.

Finally, it is an object of the present invention to provide methods as described above which will be simple, economical and reliable in use.

Other objects and advantages of the present invention will become apparent from a consideration of the following description, taken in connection with the accompanying drawing, in which.

Broadly, the present invention comprises deforming an end of a trimmed strip to be butt welded so as to produce a protruding tang on the end of the strip, preferably during the shearing operation which trims the strip, and thereafter butt welding the trimmed strip ends with a nonconsumable electrode to melt them together. Where the tang protrudes, a hole will be burned through the joint between the strip ends. After the continuous strip is plated or otherwise coated, the weld is invisible but the hole through the joint is readily detectable by a pin hole detector or the like, so that after the coiled strip is cut to sheet form, the sheets bearing the joints may be separated from those free from joints.

Figure 1:
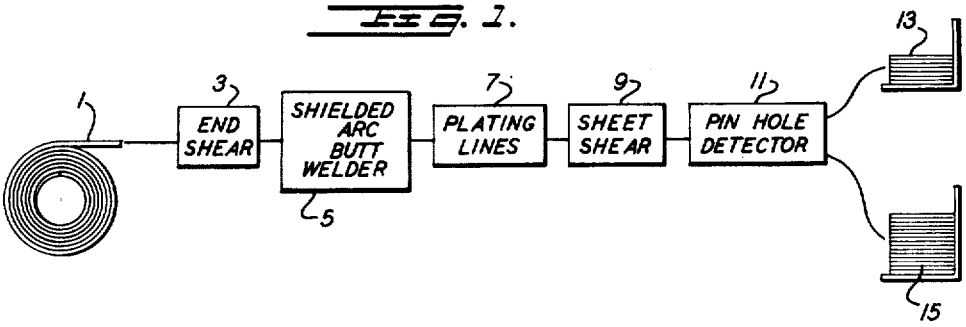
FIGURE 1 is a diagrammatic flow sheet of the process of the present invention.
Figure 2:
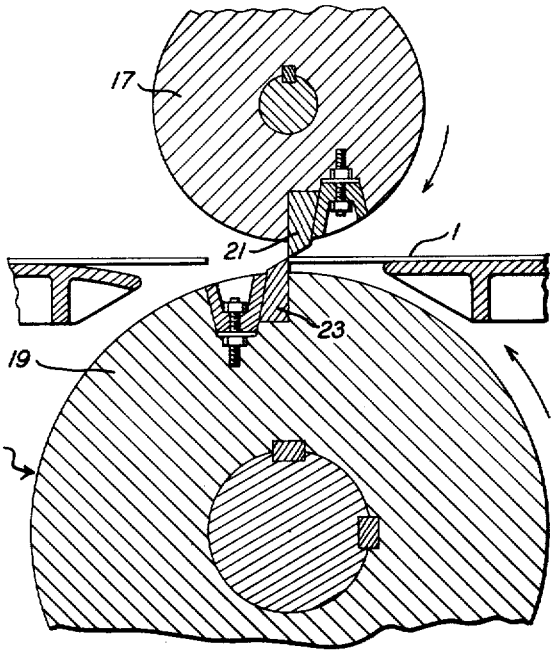
FIGURE 2 is a somewhat diagrammatic longitudinal cross-sectional view of the end shears which trim the strips prior to butt welding.

Referring now to the drawings in greater detail, there is shown diagrammatically in FIGURE 1 a flow sheet of a process according to the present invention in which coils of metal strip 1 are trimmed at their ends in end shear 3 and butt welded by a welder 5 so as to produce a continuous strip which is continuously coated in plating lines 7 and then cut to sheet form in sheet shears 9. The cut sheets are then classified and separated in a pin hole detector 11 into a pile 13 all the sheets of which contain welds and a pile 15 all of the sheets of which are free from welds.

Specifically, strips 1 may for example be tin-mill black plate, which is steel strip of 29 gauge or lighter, between 12 and 45 inches in width. The coils are unrolled one-by-one for introduction into the line, the end of each coil being joined to the end of the next coil so as to produce a continuous strip. Apart from the method of joining, the procedure of producing a continuous strip may be as outlined in U.S. Patent No. 2,478,491, August 9, 1949. In the illustrated embodiment, the coil ends are trimmed square in end shear 3 prior to joining by butt welding. End shear 3 comprises a pair of shearing rolls 17 and 19 power driven to rotate in opposite directions and having the usual shearing blades 21 and 23 which coact to shear the strip ends square in the usual manner. In this way, a flat end portion at each end of each strip is provided with a straight end edge substantially perpendicular to the length of the strip. Obviously, instead of a rotary shear, a reciprocatory shear or the like could be used.

Figure 3:
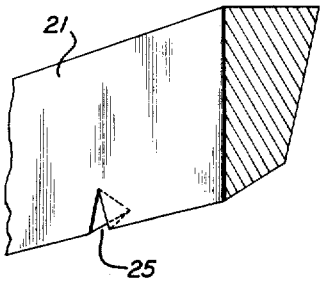
FIGURE 3 is an enlarged fragmentary perspective view of one of the shear blades of the present invention.
Figure 4:
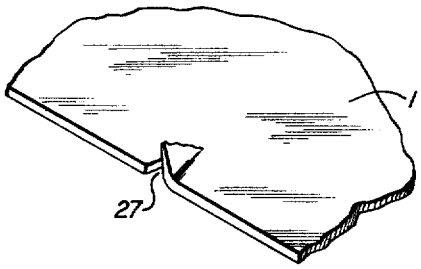
FIGURE 4 is a fragmentary perspective view of an end of a trimmed strip prior to butt welding and showing therein one form of the deformation which assures the results of the present invention.
Figure 5:
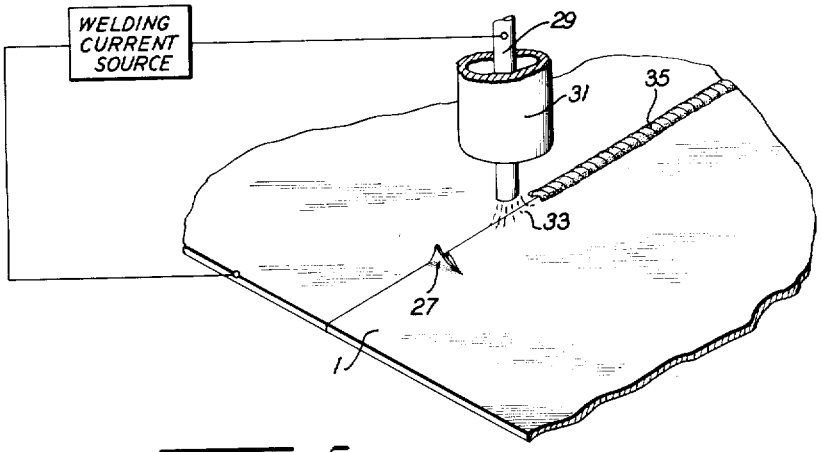
FIGURE 5 is a fragmentary perspective schematic view of the butt welding operation in an initial stage.
Figure 6:
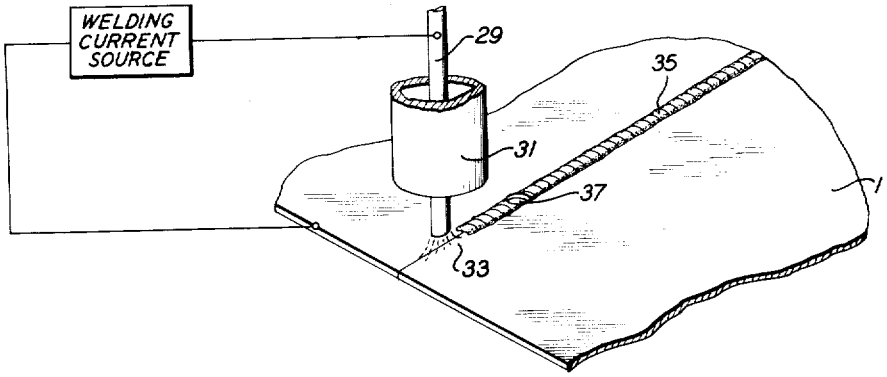
FIGURE 6 is a view similar to FIGURE 5 but showing the welding operation at a later stage.

Indeed, the structure and operation of the end shear is entirely conventional except for the fact that blade 21 is provided with a nick or notch 25 in its cutting edge, as seen in FIGURE 3. As a result, one end of each sheared strip 1 will be formed with an upstanding burr or tang 27 corresponding to that portion of strip 1 which is disposed in notch 25 and is therefore the last to separate from the remainder of strip 1. There is thus formed a projection on the edge, which is transverse but not necessarily perpendicular to the plane of the associated flat end portion.

The sheared adjacent ends of the strips are both square and are then butted endwise to form a smooth flat joint. The strips are welded together in shielded arc butt welder 5 which may for example be of the type disclosed in and operable according to the teachings of U.S. Patent No. 2,516,016, issued July 18, 1950. A nonconsumable electrode 29 in circuit with the work is shielded by a continuous stream of an inert gas such as helium or argon or mixtures of the two which emerges from welding torch 31 about the end of the electrode. Of course, types of butt welding other than shielded arc may also be used.

During the welding operation, the arc 33 between the electrode and the work is distributed over a relatively large area of the abutting edges of the strips to be welded together and serves continuously to melt adjacent end edge portions of the strips. As the arc moves on along the joint, the melted portions leave the region of the arc and rapidly cool down and resolidify to an integral weld 35.

However, when arc 33 reaches tang 27, the distribution of the arc over a relatively large area of the strip edges is destroyed and substantially all of the arc is concentrated through tang 27 which provides in effect a short circuit across the gap between the electrode and the work. As a result, there is concentrated and severe overheating of tang 27 and the metal by which it is joined to the remainder of strip 1, and this metal not only melts but also vaporizes, a phenomenon known as "burning" in the welding art. The result is that a small hole 37 remains through weld 35 after the arc has passed on. The hole 37 corresponds in location to tang 27 and represents the loss of metal by vaporization upon burning.

The continuous strip produced by the end-to-end butt welding of strips 1 passes through plating lines 7 which may be of the conventional galvanizing or tinplating type or of other types adapted to deposit an opaque metallic or non-metallic coating on both sides of the strip. In the plating lines, a metallic coating such as tin is applied to the continuous strip, and as is usual in the case of plating strip having pin holes such as hole 37 therein, the plating alloy does not bridge across the hole but leaves a hole entirely through the strip.

There is thus produced a continuous strip having pin holes therethrough deliberately placed at the locations of the welds. This selectively perforated coated strip is then fed to the sheet shear 9 and pin hole detector 11 by which it is cut into a plurality of sheets of desired length and width and the sheets having pin holes corresponding to holes 37 therethrough directed to a defective sheet piler 13 while the remaining sheets pass to the prime sheet piler 15. As is usual, detection of the pinholes is accomplished by the completion of a photoelectric circuit through the pin holes. Of course, it is immaterial whether the pin holes are detected before or after the strip is sheared to sheet form, and a suitable mechanism for detecting pin holes, shearing the strip to sheet form and assorting the sheets according to the presence or absence of pin holes therein is disclosed in Dowell Patent No. 2,433,685, December 30, 1947, the disclosure of which is incorporated by reference in the present application to avoid the needless repetition of the subject matter thereof. Needless to say, sheets having pin holes other than those deliberately created at the location of the butt welds will be directed to defective sheet piler 13, so that the sheets in piler 13 will not necessarily all have welds therein. On the other hand, none of the sheets in piler 15 will have welds therein, and these latter sheets may then be used in fabricating equipment such as can making machinery without damage to the machinery. It is also within the scope of this invention that the pin hole detector merely mark the sheets or portions of the uncut strip having perforate welds therein, so that the prime and defective sheets may later be sorted by visual inspection. Such automatic marking followed by sorting by visual inspection, as well as the other methods of sorting recited above, comprise separating the sheets containing the joints from the remaining sheets by means automatically responsive to the presence of the holes.

From a consideration of the foregoing, it will be obvious that all of the initially recited objects of the present invention have been achieved.

Although the present invention has been described and illustrated in connection with preferred embodiments, it is to be understood that modifications and variations may be resorted to without departing from the spirit of this invention, as those skilled in this art will readily understand. For example, it is also within the contemplation of the invention in its broader aspects to form the holes at the welds by methods other than that specifically recited above. Such modifications and variations are considered to be within the purview and scope of the present invention as defined by the appended claims.

What is claimed is:

1. A method of joining endwise a pair of elongated metal strips each having a flat end portion terminating in a straight end edge, comprising the steps of forming a projection on at least one of said straight end edges intermediate the ends thereof and transverse to the plane of the associated flat end portion, butting said edges, and progressively melting said butted edges with a nonconsumable electrode to form a butt-welded joint having a hole therethrough at the location of the projection.

2. A method of producing a coated metal strip from a pair of elongated metal strips each having a flat end portion terminating in a straight end edge, comprising the steps of forming a projection on at least one of said straight end edges intermediate the ends thereof and transverse to the plane of the associated flat end portion, buttin said edges, progressively melting said butted edges with a nonconsumable electrode to form a butt-welded joint having a hole therethrough at the location of the projection, and coating both sides of the joined strips with an opaque coating of a desired thickness without closing the hole.

3. A method of producing a plurality of metal sheets from a pair of elongated metal strips each having a straight end edge, comprising the steps of butt-welding said end edges together with a hole through the butt-welded joint intermediate the ends of the joint, cutting the joined strips transversely of their length into a plurality of sheets one of which contains the joint, and separating the sheet containing the joint from the remaining sheets by means automatically responsive to the presence of the hole thereby to obtain a plurality of sheets all of which are free from joints.

4. A method of producing a plurality of coated metal sheets from a pair of elongated metal strips each having a straight end edge, comprising the steps of butt-welding said end edges together with a hole through the butt-welded joint intermediate the ends of the joint, coating both sides of the joined strips with an opaque coating of a desired thickness without closing the hole, cutting the joined strips transversely of their length into a plurality of sheets one of which contains the joint, and separating the sheet containing the joint from the remaining sheets by means automatically responsive to the presence of the hole thereby to obtain a plurality of coated sheets all of which are free from joints.

5. A method of producing a plurality of metal sheets from a pair of elongated metal strips each having a flat end portion terminating in a straight end edge, comprising the steps of forming a projection on at least one of said straight end edges intermediate the ends thereof and transverse to the plane of the associated flat end portion, butting said edges, progressively melting said butted edges with a nonconsumable electrode to form a butt-welded joint having a hole therethrough at the location of the projection, cutting the joined strips transversely of their length into a plurality of sheets one of which contains the joint, and separating the sheet containing the joint from the remaining sheets by means automatically responsive to the presence of the hole thereby to obtain a plurality of sheets all of which are free from joints.

6. A method of producing a plurality of coated metal sheets from a pair of elongated metal strips each having a flat end portion terminating in a straight end edge comprising the steps of forming a projection on at least one of said straight end edges intermediate the ends thereof and transverse to the plane of the associated flat end portion, butting said edges, progressively melting said butted edges with a nonconsumable electrode to form a butt-welded joint having a hole therethrough at the location of the projection, coating both sides of the joined strips with an opaque coating of a desired thickness without closing the hole, cutting the joined strips transversely of their length into a plurality of sheets one of which contains the joint, and separating the sheet containing the joint from the remaining sheets by means automatically responsive to the presence of the hole thereby to obtain a plurality of coated sheets all of which are free from joints.

7. *A method of producing a plurality of metal sheets from a pair of elongated metal strips each having a straight end edge, comprising the steps of bonding said end edges together with a hole through the assembly of bonded strips contiguous to the joint between said end edges and spaced between the side edges of the assembly of bonded strips, cutting the joined strips transversely of their length into a plurality of sheets one of which contains the joint, and separating the sheet containing the joint from the remaining sheets by means automatically responsive to the presence of the hole thereby to obtain a plurality of sheets all of which are free from joints.*

8. *A method of producing a plurality of metal sheets from a pair of elongated metal strips each having a straight end edge, comprising the steps of bonding said end edges together with a hole through the assembly of bonded strips contiguous to the joint between said end edges and spaced between the side edges of the assembly of bonded strips, coating both sides of the joined strips with an opaque coating of a desired thickness without closing the hole, cutting the joined strips transversely of their length into a plurality of sheets one of which contains the joint, and separating the sheet containing the joint from the remaining sheets by means automatically responsive to the presence of the hole thereby to obtain a plurality of coated sheets all of which are free from joints.*

References Cited in the file of this patent

UNITED STATES PATENTS

| | | |
|---|---|---|
| 1,426,683 | Stalhane | Aug. 22, 1922 |
| 1,512,787 | Morton | Oct. 21, 1924 |
| 1,944,094 | Mayweg | Jan. 16, 1934 |
| 2,047,221 | Pechy | June 14, 1936 |
| 2,433,685 | Dowell | Dec. 30, 1947 |
| 2,516,016 | Pakala | July 18, 1950 |
| 2,649,528 | Koenig et al. | Aug. 18, 1953 |
| 2,753,464 | Stone | July 3, 1956 |
| 2,871,940 | Meunier | Feb. 3, 1959 |